(12) United States Patent
Lin et al.

(10) Patent No.: US 10,990,227 B2
(45) Date of Patent: Apr. 27, 2021

(54) TOUCH PAD

(71) Applicants: LITE-ON Technology (Chang Zhou) Co., LTD., Jiangsu Province (CN); LITE-ON Technology Corporation, Taipei (TW)

(72) Inventors: Yi Ren Lin, Jiangsu Province (CN); Tsung Yan Wu, Jiangsu Province (CN)

(73) Assignees: LITE-ON TECHNOLOGY (CHANG ZHOU) CO., LTD., Jiangsu (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 16/203,540

(22) Filed: Nov. 28, 2018

(65) Prior Publication Data

US 2019/0369767 A1 Dec. 5, 2019

(30) Foreign Application Priority Data

Jun. 1, 2018 (CN) .......................... 201810554511.6

(51) Int. Cl.
*G06F 3/044* (2006.01)
*F21V 8/00* (2006.01)

(52) U.S. Cl.
CPC ............. *G06F 3/044* (2013.01); *G02B 6/005* (2013.01); *G02B 6/0068* (2013.01); *G02B 6/0073* (2013.01)

(58) Field of Classification Search
CPC ............... G06F 3/044; H01L 27/14623; H01L 27/14621; H01L 27/322; G02B 5/201; G02B 5/22; G02B 6/055; G02F 1/133514; G02F 1/133615; G02F 1/13473; G02F 1/133528; G02F 2203/055; G02F 2001/136222
See application file for complete search history.

(56) References Cited

U.S. PATENT DOCUMENTS

| 2009/0026053 A1* | 1/2009 | Lerenius | G06F 3/0202 200/314 |
| 2012/0147584 A1* | 6/2012 | Wu | G06F 3/0202 362/23.16 |

\* cited by examiner

*Primary Examiner* — Dong Hui Liang
(74) *Attorney, Agent, or Firm* — Umberg Zipser LLP

(57) ABSTRACT

A touch pad comprises a capacitive sensor for sensing a manipulation gesture; a light guiding plate arranged on the capacitive sensor; an identification layer having a pattern disposed on the light guiding plate; a filter layer disposed on the identification layer, the filter layer having a first filter region and a second filter region, wherein the first filter region and the second filter region do not overlap; and a light emitting module having a light emitting surface, wherein the light emitting module is disposed at the periphery of the light guiding plate; wherein the light emitting surface provides light to the light guiding plate; the light passes through the first filter region to be a first shade, and the light passes through the second filter region to be a second shade; the color of the first shade is different from the color of the second shade.

10 Claims, 3 Drawing Sheets

TOUCH PAD

CROSS REFERENCE TO RELATED APPLICATION

This application claims the priority benefit of Chinese Patent Application Serial Number 201810554511.6, filed on Jun. 1, 2018, the full disclosure of which is incorporated herein by reference.

BACKGROUND

Technical Field

This present invention generally relates to the field of touch pads, and in particular, to the structure of a touch pad.

Related Art

In the past, the touch pad of a mobile terminal usually has no additional display or identification function. Even though there is a specific identification on the touch pad, such as a scrolling identification bar on the periphery of the touch pad, most are formed by way of printing, for which is a static exhibition. As technology advances, a display with backlights becomes an available option provided for the identification of the touch pad. However, the backlight used for the touch pad identification can only be rendered a monochromatic light, making the touchpad identification monotonous and lacking interactivity. If more colors are configured for the backlight of the touch pad, this would increase the thickness of the touch pad, which affects the sensitivity of the touch pad and affects the accuracy of the user's touch. Therefore, most of the identification on the existing touch pads only use backlight having single color.

SUMMARY

The present invention provides a touch pad to solve the disadvantage that the logo on the touch pad in the prior art can only provide monochromatic light.

In order to solve the above technical problems, the present invention discloses embodiments as follows.

A first embodiment of the present invention provides a touch pad. The touch pad comprises:
  a capacitive sensor for sensing a manipulation gesture;
  a light guiding plate arranged on the capacitive sensor;
  an identification layer having a pattern disposed on the light guiding plate;
  a filter layer disposed on the identification layer, the filter layer having a first filter region and a second filter region, wherein the first filter region and the second filter region do not overlap; and
  a light emitting module having a light emitting surface, wherein the light emitting module is disposed at the periphery of the light guiding plate;
  wherein the light emitting surface provides light to the light guiding plate; the light passes through the first filter region to be a first shade, and the light passes through the second filter region to be a second shade; the color of the first shade is different from the color of the second shade.

In the embodiment of the present invention, the filter layer comprises a first filter disposed on the light guiding plate and in the first filter region; and a second filter disposed on the light guiding plate and in the second filter region; wherein the light passes through the first filter to be a first shade, and the light passes through the second filter to be the second shade.

In the embodiment of the present invention, the wavelength of the light passes through the first filter corresponds to the color of the first shade, and the wavelength of the light passing through the second filter corresponds to the color of the second shade.

In the embodiment of the present invention, the pattern of the identification layer comprises a first pattern and a second pattern; the identification layer is disposed on the filter layer; a shape of the first filter region of the filter layer conforms to a shape of the first pattern, and a shape of the second filter region of the filter layer conforms to a shape of the second pattern.

In the embodiment of the present invention, the first pattern and the second pattern are light transmissive regions, and the regions other than the first pattern and the second pattern are light shielding areas.

In the embodiment of the present invention, the wavelength of the light passes through the first filter region corresponds to the color of the first shade, and the wavelength of the light passing through the second filter region corresponds to the color of the second shade.

In the embodiment of the present invention, the touch pad comprises a protective layer having an outer surface and an inner surface, the outer surface being disposed opposite to the inner surface, the protective layer being disposed on the filter layer, the inner of the protective layer facing the filter layer.

In the embodiment of the present invention, the identification layer is a dot on the light guiding plate, and the shape of the dot corresponds to the shape of the pattern.

In the embodiment of the present invention, the light emitting module comprises RGB color light emitting diodes.

In the embodiment of the present invention, the touch pad comprises a controller electrically connected to the capacitive sensor and the light emitting module, wherein the controller controls the light emitting module to provide the light of different colors according to the sensing signal of the capacitive sensor.

A first embodiment of the present invention provides a terminal comprises memory, a processor, and the touch pad oft the various embodiments described above.

In the present invention, the filter layer has a plurality of polarizing regions, and the light emitting module provides light of different colors to pass through the different polarizing regions, thereby illuminating the identification layers located in the different polarizing regions. Therefore, the identification of the touch pad may be presented in various colors.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 3 4 is a cross-sectional view of the touch pad of the second embodiment of the present application taken along line Y-Y' of FIG. 3.

DETAILED DESCRIPTION OF THE EMBODIMENTS

Figure 1:
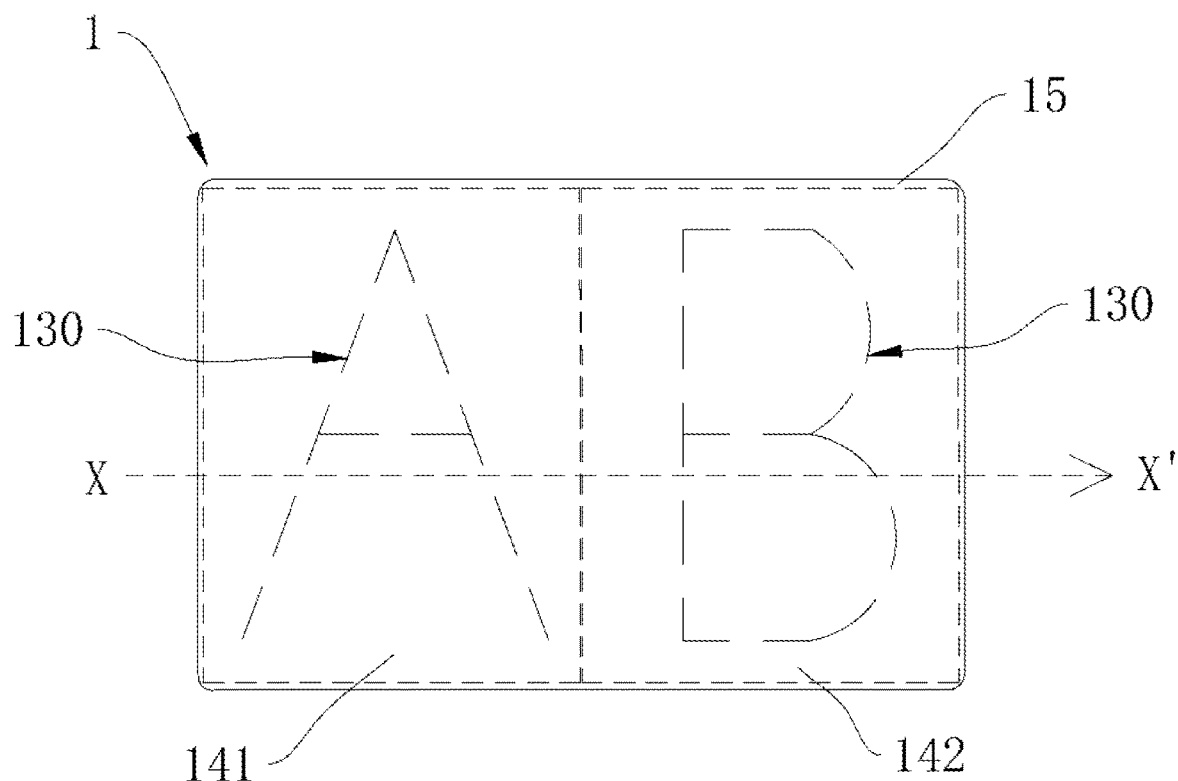
FIG. 1 is a top view of a touch pad of a first embodiment of the present application.

The present disclosure will now be described more fully hereinafter with reference to the accompanying drawings, in which exemplary embodiments of the application are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substaintial/substaintially" means, within an acceptable error range, the person skilled in the art may solve the technical problem in a certain error range to achieve the basic technical effect. Additionally the term "couple" or "connect" covers any direct or indirect electrically coupling means. Therefore when one device is electrically connected to another device in the context, that connection may be through a direct electrical connection, or through an indirect electrical connection via other devices and connections. The following description is of the best-contemplated mode of carrying out the application. This description is made for the purpose of illustration of the general principles of the application and should not be taken in a limiting sense. The scope of the application is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals is used to refer to the same or similar elements throughout the disclosure.

Figure 2:
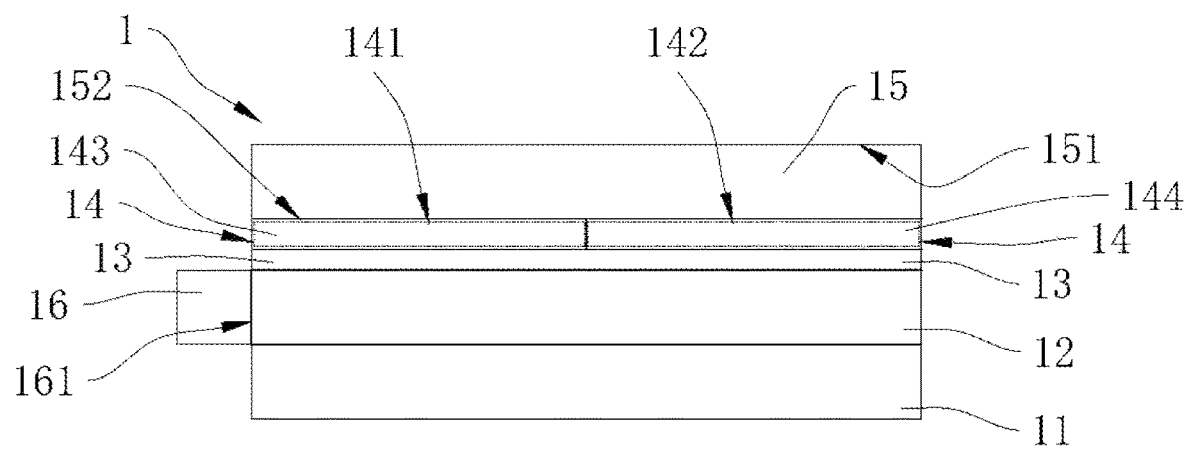
FIG. 2 is a cross-sectional view of the touch pad of the first embodiment of the present application taken along line X-X' of FIG. 1.

FIG. 1 is a top view of a touch pad of a first embodiment of the present application. FIG. 2 is a cross-sectional view of the touch pad of the first embodiment of the present application taken along line X-X' of FIG. 1. As shown in FIG. 1 and FIG. 2, the touch pad 1 of the present invention comprises a capacitive sensor 11, a light guiding plate 12, an identification layer 13, a filter layer 14, a protective layer 15, and a light emitting module 16. The capacitive sensor 11 is configured to sense a user's manipulation gesture or a finger touch. The light guiding plate 12 is disposed on the capacitive sensor 11 for uniformly transmitting the light of the light-emitting module 16. The identification layer 13 is disposed above the light guiding plate 12 and has a pattern 130.

Continuously referring to FIG. 1 and FIG. 2, the filter layer 14 is disposed on the identification layer 13. The filter layer 14 has a first filter region 141 and a second filter region 142. The first filter region of the filter layer 14 and the second filter region 142 of the filter layer 14 do not overlap with each other. The light passes through the first filter region 141 to be a first shade, and the light passes through the second filter region 142 to be a second shade. The color of the first shade is different from the color of the second shade. For example, the first shade is red and the second shade is green. The protective layer 15 has an outer surface 151 and an inner surface 152. The outer surface 151 is disposed opposite to the inner surface 152. The protective layer 15 is disposed on the filter layer 14. The inner surface 152 of the protective layer 15 faces the filter layer 14, and the outer surface 151 of the protective layer 15 serves as a contact surface for the user to manipulate the touch pad 1. The light emitting module 16 further has a light emitting surface 161. The light emitting module 16 is disposed on a periphery of the light guiding plate 12, and the light emitting surface 161 provides light to the light guiding plate 12. The light emitting module 16 can be an RGB color light emitting diode.

In the first embodiment of the present invention, the identification layer 13 is a dot on the light guiding plate 12. The shape of the dot corresponds to the shape of the pattern 130. The filter layer 14 is in the form of a filter. In the first embodiment, the filter layer 14 includes a first filter 143 and a second filter 144. The first filter 143 is disposed above the light guiding plate 12 and located in the first filter region 141. The second filter 144 is disposed above the light guiding plate 12 and located in the second filter region 142. The light of the first color may pass through the first filter 143 to be the first shade, such as red. The light of the second color passes through the second filter 144 to be a second shade, such as green. The wavelength of the light passing through the first filter 143 corresponds to the color of the first shade, and the wavelength of the light passing through the second filter 144 corresponds to the color of the second shade.

When the light emitting module 16 provides the light of the first color to the light guiding plate 12, for example, red, because the wavelength of the light of the first color corresponds to the wavelength of the light that can pass through the first filter 143, the first color filter 143 may pass through the first filter 143 to become the first shade. However, since the wavelength of the light of the first color does not correspond to the wavelength of the light that can pass through the second filter 144, the light of the first color cannot pass through the second filter 144 to become the second shade. That is to say, when the light emitting module 16 provides the light of the first color to the light guiding plate 12, the light of the first color only passes through the first filter region 141 which the first color filter 143 is located in. Thus, the pattern 130 in the first filter region 141 only presents a backlight of the first shade, which can be seen through the protective layer 15. In the present embodiment, that is, the pattern 130 located in the first filter region 141 presents a red backlight, and the pattern 130 located in the second filter region 142 does not present a backlight. In other words, when the light emitting module 16 provides the light of the second color to the light guiding plate 12, for example, green, since the wavelength of the light of the second color only corresponds to the wavelength of the light that can pass through the second filter 144, only the pattern 130 of the second filter region 142 where the second filter 144 is located presents a backlight of the second shade. In this embodiment, the pattern 130 located in the first filter region 141 exhibits a green backlight, and the pattern 130 located in the first filter region 141 does not exhibit a backlight.

In the first embodiment, the first filter region 141 and the second filter region 142 of the filter layer 14 are merely illustrative. The filter layer 14 is not limited to the two filter regions. For example, the filter layer 14 may also include more than two filter regions as required by the touch pad identification, for example, three filter regions, four filter regions, eight filter regions or ten filter zones. When the filter layer 14 has a plurality of filter regions, the filters corresponding to different wavelengths of light passing through are also disposed correspondingly to different filter regions, thereby achieving the function of filtering light of different colors. Each of the filter regions may also correspond to different colors of light, for example, the first filter region corresponds to the blue light, the second filter region corresponds to the red light, the third filter region corresponds to the green light, and the fourth filter region corresponds to the yellow light.

Figure 3:
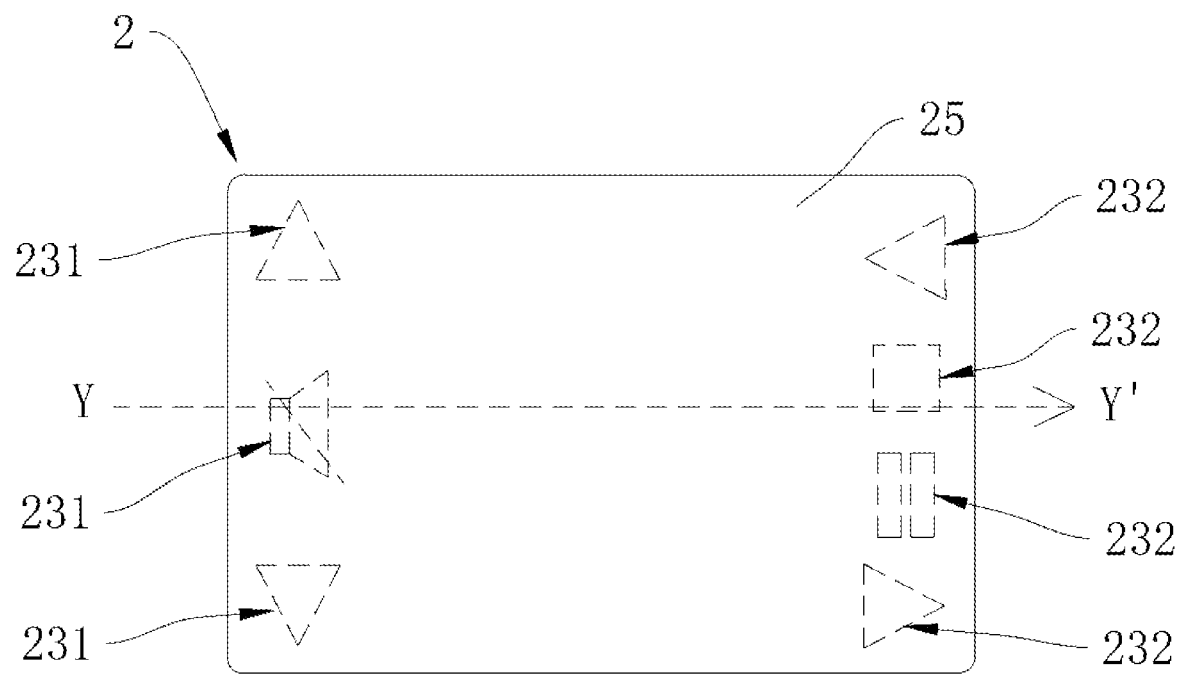
FIG. 3 is a top view of a touch pad of a second embodiment of the present application.
Figure 4:
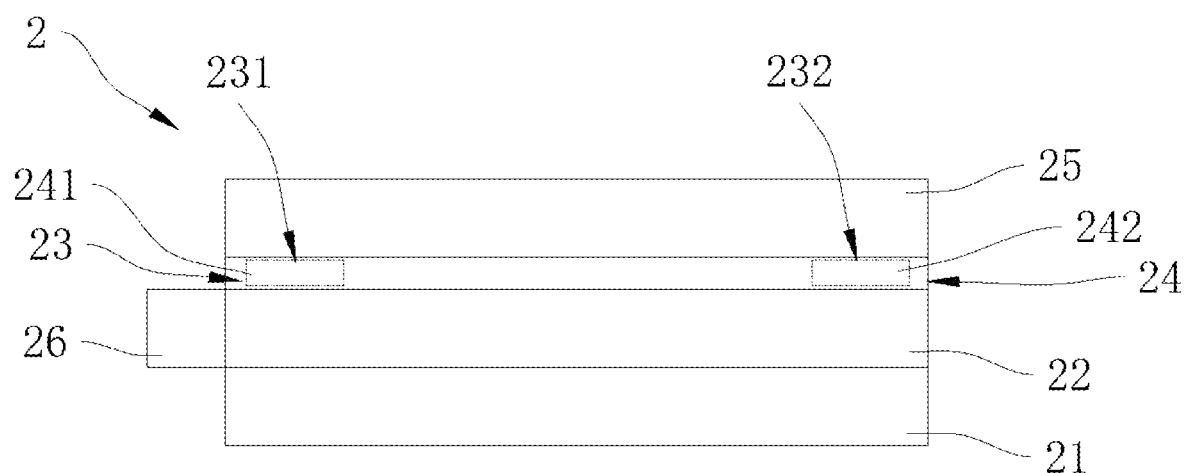

FIG. 3 is a top view of a touch pad of a second embodiment of the present invention. FIG. 4 is a cross-sectional view of the touch pad of the second embodiment of the present application taken along line Y-Y' of FIG. 3. As shown in FIG. 3 and FIG. 4, the touch pad of the second embodiment of the present application is similar to the first embodiment. The touch pad of the second embodiment comprises a capacitive sensor 21, a light guiding plate 22, an identification layer 23, a filter layer 24, a protective layer 25, and a light emitting module 26. The functions of the respective elements in the second embodiment are similar to those of the first embodiment, and the description will not be repeated hereinafter. The detailed description of the differences between the second embodiment and the first embodiment is given as follows.

In the second embodiment of the present invention, the filter layer 24 is in the form of a coating film. The filter layer 24 can be formed on the protective layer 25 to have a filtering function by a physical vapor deposition or a chemical vapor deposition. The coating of the filter layer 24 can pass different wavelengths of light as needed. In the second embodiment, the pattern of the identification layer 23 includes a first pattern 231 and a second pattern 232. In the second embodiment, the identification layer 23 is disposed on the filter layer 24. The shape of the first filter region 241 of the filter layer 24 conforms to the shape of the first pattern 231. The shape of the second filter region 242 of the filter layer 24 conforms to the shape of the first pattern 232. The first pattern 231 and the second pattern 232 are light transmissive regions, and the regions other than the first pattern 231 and the second pattern 232 are light shielding regions. The wavelength of the light passing through the first filter region 241 corresponds to the color of the first shade, and the wavelength of the light passing through the second filter region 242 correspond to the color of the second shade.

In other words, the identification layer 23 may be a light transmitting region formed on the filter layer 24. The first pattern 231 is located in the first filter region 241, for the light of the first color passing through to become the first shade, for example, red. The second pattern 232 is located in the second filter region 242 for the light of the second color passing through to become the second shade, such as green. In the second embodiment, the wavelength of the red light corresponds to the wavelength of the light passing through the first filter region 241, and thus the red light can pass through the first filter region 241. The wavelength of the green light corresponds to the wavelength of the light passing through the second filter region 242, so the green light can pass through the second filter region 242.

Continuously referring to FIG. 3 and FIG. 4, in the second embodiment, the first filter region 241 and the second filter region 242 of the filter layer 24 are merely illustrative. The filter layer 24 is not limited to two filter regions, and the filter layer 24 may also include more than two filter regions, such as three filter regions or eight filter regions, depending on the requirements of the touch pad identification. When the filter layer 24 has a plurality of filter regions, the filter films corresponding to different wavelengths of light passing through are also disposed correspondingly to different regions of the protective layer to form a filter region, thereby achieving the function of filtering light of different colors.

Figure 5:
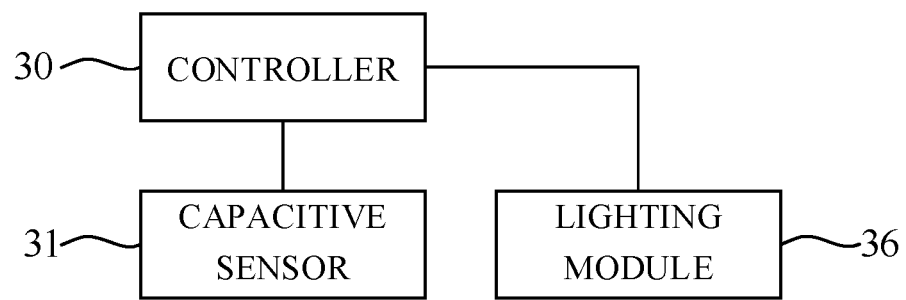
FIG. 5 is a schematic block diagram of the touch pad according to various embodiments of the present application.

FIG. 5 is a schematic block diagram of a touch pad according to various embodiments of the present application. As shown in the figure, the touch pad further includes a controller 30. The controller 30 is electrically connected to the capacitive sensor 31 and the light emitting module 36. The controller 30 is configured to control the lighting module 36 to provide light of different colors according to the sensing signal of the capacitive sensor 31. The capacitive sensor 31 is capable of providing information in a Precision Touchpad (PTP) format that supports the Microsoft Windows operating system. When the pattern of the touch pad is used as a hot key or a quick key, after the processor receives the signal of the PTP format, the processor can transform the signal of the PTP format into a hot key information signal of a relative position based on the PTP format, and then transmit the hot key information to the central processing unit (CPU) of the terminal device running operation system. When the pattern of the touch pad is used as a numeric keypad, the processor can transform the signal of the PTP format into a numeric key of a relative position based on the PTP format, and then transmit the numeric key to the central processing unit (CPU) of the terminal device running operation system. The processor can also directly transmit the signal to the central processing unit for execution in the operating system based on the PTP format In the present invention, the filter layer has a plurality of polarizing regions, and the light emitting module provides light of different colors to pass through the different polarizing regions, thereby illuminating the identification layers located in the different polarizing regions. Therefore, the identification of the touch pad may be presented in various colors.

In addition, the polarizing layer is disposed on the protective layer in the form of a coating layer to form a polarizing region, so that the structural thickness of the touch pad can be reduced, and the sensing sensitivity of the touch pad and the accuracy of the user's touch are improved.

In addition, through the design that the polarizing layer has a plurality of polarizing regions, the touch pad can provide a backlight of multiple colors by requiring only one layer of light guiding layer. The additional backlight layer is not required in order to match the requirement for the backlight of different colors, thereby effectively reducing the structure of the touch pad. The effect on the sensing sensitivity of the touch pad is also reduced.

In addition, the touch pad provides backlights of different colors according to the different identification, thereby expanding the application scenario of the touch pad and improving the user experience when the user operates the touch pad to control the terminal device.

In addition, the control signal generated by the touchpad supports Precision Touchpad (PTP) format of Microsoft Windows operation system, which enables the touchpad to completely cooperate with the window system to provide complete control capabilities and enhance the user experience for the touch operation in the operating system.

It is to be understood that the term "comprises", "comprising", or any other variants thereof, is intended to encompass a non-exclusive inclusion, such that a process, method, article, or device of a series of elements not only includes those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A touch pad, comprising:
   a capacitive sensor configured to sense a manipulation gesture;
   a light guiding plate arranged on the capacitive sensor;
   an identification layer having a pattern disposed on the light guiding plate;
   a filter layer disposed on the identification layer, the filter layer having a first filter region and a second filter region, wherein the first filter region and the second filter region do not overlap; and
   a light emitting module having a light emitting surface, wherein the light emitting module is disposed at the periphery of the light guiding plate;
   wherein the light emitting surface provides light to the light guiding plate; the light passes through the first filter region to be a first shade, and the light passes through the second filter region to be a second shade; the color of the first shade is different from the color of the second shade.

2. The touch pad according to claim 1, wherein the filter layer comprises:
   a first filter disposed on the light guiding plate and in the first filter region; and
   a second filter disposed on the light guiding plate and in the second filter region;
   wherein the light passes through the first filter to be the first shade, and the light passes through the second filter to be the second shade.

3. The touch pad according to claim 2, wherein the wavelength of the light passes through the first filter corresponds to the color of the first shade, and the wavelength of the light passing through the second filter corresponds to the color of the second shade.

4. The touch pad according to claim 1, wherein the pattern of the identification layer comprises a first pattern and a second pattern; a shape of the first filter region of the filter layer conforms to a shape of the first pattern, and a shape of the second filter region of the filter layer conforms to a shape of the second pattern.

5. The touch pad according to claim 4, wherein the first pattern and the second pattern are light transmissive regions, and the regions other than the first pattern and the second pattern are light shielding areas.

6. The touch pad according to claim 1, wherein the wavelength of the light passes through the first filter region corresponds to the color of the first shade, and the wavelength of the light passing through the second filter region corresponds to the color of the second shade.

7. The touch pad according to claim 1, wherein the touch pad comprises a protective layer having an outer surface and an inner surface, the outer surface being disposed opposite to the inner surface, the protective layer being disposed on the filter layer, the inner surface of the protective layer facing the filter layer.

8. The touch pad according to claim 1, wherein the identification layer is a dot on the light guiding plate, and the shape of the dot corresponds to the shape of the pattern.

9. The touch pad according to claim 1, wherein the light emitting module comprises RGB color light emitting diodes.

10. The touch pad according to claim 1, wherein the touch pad comprises a controller electrically connected to the capacitive sensor and the light emitting module, wherein the controller controls the light emitting module to provide the light of different colors according to the sensing signal of the capacitive sensor.

* * * * *